(12) United States Patent
Jokinen (10) Patent No.: US 12,391,071 B2
(45) Date of Patent: Aug. 19, 2025

(54) TREAD BLOCK ARRANGEMENT HAVING A SIPE

(71) Applicant: Nokian Renkaat Oyj, Nokia (FI)

(72) Inventor: Mikko Jokinen, Tampere (FI)

(73) Assignee: NOKIAN RENKAAT OYJ, Nokia (FI)

( * ) Notice: Subject to any disclaimer, the term of this patent is extended or adjusted under 35 U.S.C. 154(b) by 17 days.

(21) Appl. No.: 17/959,981

(22) Filed: Oct. 4, 2022

(65) Prior Publication Data

US 2023/0131314 A1    Apr. 27, 2023

(30) Foreign Application Priority Data

Oct. 22, 2021    (EP) .................................... 21204231

(51) Int. Cl.
  *B60C 11/03*    (2006.01)
  *B60C 11/11*    (2006.01)
  *B60C 11/12*    (2006.01)

(52) U.S. Cl.
  CPC ........... *B60C 11/0306* (2013.01); *B60C 11/11* (2013.01); *B60C 11/1204* (2013.01); *B60C 11/1236* (2013.01); *B60C 11/1263* (2013.01); *B60C 2011/0339* (2013.01); *B60C 2011/1254* (2013.01)

(58) Field of Classification Search
  CPC ............. B60C 11/1263; B60C 11/1281; B60C 11/1323; B60C 2011/1213; B60C 2011/1254; B60C 11/1204; B60C 11/1218
  See application file for complete search history.

(56) References Cited

U.S. PATENT DOCUMENTS

| 7,213,625 B2 | 5/2007 | Martin et al. |
| 9,669,663 B2 | 6/2017 | Berger et al. |
| 2003/0029537 A1* | 2/2003 | Iwamura ................. B60C 11/12 152/209.18 |

(Continued)

FOREIGN PATENT DOCUMENTS

| EP | 1090781 A2 * | 4/2001 | ......... B60C 11/0306 |
| EP | 3640058 A1 | 4/2020 | |

(Continued)

OTHER PUBLICATIONS

JP 2007126139 Machine Translation (Year: 2007).*
JP-2005104194-A Machine Translation (Year: 2005).*

*Primary Examiner* — Katelyn W Smith
*Assistant Examiner* — Wendy L Boss
(74) *Attorney, Agent, or Firm* — Merchant & Gould P.C.

(57) ABSTRACT

A tread block arrangement is suitable for a tire or for a tread band for a tire. The tread block arrangement includes a tread block having a first sipe delimited by a first sipe wall, a second sipe wall and a bottom of the sipe. The first sipe wall and the second sipe wall are arranged parallel to each other and define a width of the sipe. At least the first sipe wall has an indentation to increase an empty volume of the sipe at the location of the indentation. The first sipe wall has an inclined section to form the indentation, wherein a distance between the first sipe wall and the second sipe wall increases towards the bottom of the sipe at the location of the inclined section. A tire has the tread block arrangement and a lamella plate for forming sipes of the tread block arrangement.

18 Claims, 5 Drawing Sheets

(56) References Cited

U.S. PATENT DOCUMENTS

| | | | |
|---|---|---|---|
| 2010/0218867 A1* | 9/2010 | Matsumoto | B60C 11/12 |
| | | | 152/209.18 |
| 2012/0312438 A1* | 12/2012 | Shinzawa | B60C 11/0302 |
| | | | 152/209.8 |
| 2015/0165828 A1* | 6/2015 | Kaji | B60C 11/11 |
| | | | 152/209.18 |
| 2017/0120692 A1 | 5/2017 | Durand-Gasselin et al. | |
| 2019/0210410 A1* | 7/2019 | Tikka | B60C 11/0306 |
| 2021/0188012 A1* | 6/2021 | Rodriquez | B60C 11/1281 |

FOREIGN PATENT DOCUMENTS

| | | | | |
|---|---|---|---|---|
| FR | 3019096 A1 | 10/2015 | | |
| JP | 2005104194 A | * | 4/2005 | B60C 11/1218 |
| JP | 2007126139 A | * | 5/2007 | B60C 11/12 |
| WO | 2002/060705 A1 | 8/2002 | | |
| WO | 2013/007745 A1 | 1/2013 | | |
| WO | 2018/083414 A1 | 5/2018 | | |

\* cited by examiner

TREAD BLOCK ARRANGEMENT HAVING A SIPE

CROSS-REFERENCE TO RELATED APPLICATIONS

This application claims priority benefit of Serial No. 21204231.1, filed Oct. 22, 2021 in Europe, and which application is incorporated herein by reference. To the extent appropriate, a claim of priority is made to the above-disclosed application.

TECHNICAL FIELD

The present invention relates to a pneumatic tire (a.k.a. tyre) or a tread band having tread blocks, and being provided in the tread blocks with sipes, more particularly to an improved sipe structure or sipe arrangement of a tread block. The present invention also relates to lamella plates that are used in the manufacturing process of a pneumatic tire for making said sipe structure or sipe arrangement.

BACKGROUND

Figure 1A:
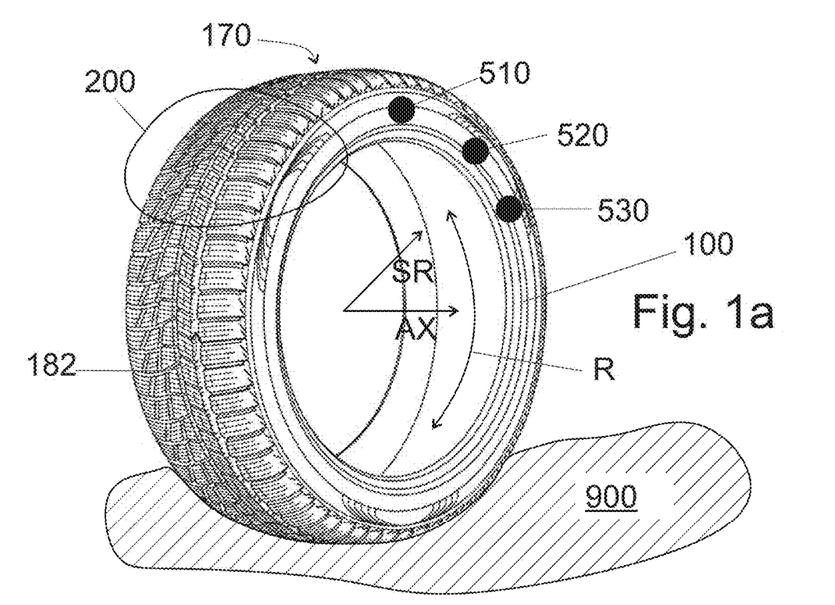
FIG. 1a shows a pneumatic tire having a tread block arrangement forming the tread of the tire, the tread block arrangement limiting a groove pattern.

A tread of a known pneumatic tire is indicated in FIG. 1a. A pneumatic tire is known to include a tread which has circumferential and transversal grooves on its outer surface, said grooves defining a number of protruding parts, such as ribs and tread blocks. The tread is meant for a rolling contact against a ground surface, such as road. The grooves are meant for draining water and/or slush that is possibly located on the ground surface away from the tread, so that the contact between the tread and the ground surface is as good and consistent as possible. Certain types of tires such as winter tires are provided in the tread with a number of sipes at various angles with respect to a motion direction of the tire. The sipes not only serve a better tire-ground contact in rain, but also improve traction, braking and lateral stability on snow by trapping snow as well as providing more gripping edges. The sipes also make the rubber material to deform more easily, in effect making the tire appear softer. This also improves friction.

The international patent application WO2013007745 discloses a tire, which includes a rolling surface having incisions that have a substantially transverse orientation, open onto the rolling surface, have a depth P, and form, on the rolling surface of the tire in the new condition, two edges defining at least one narrow portion of the incision having a mean width LE<=2 mm and at least one wide portion of the incision having a mean width LL>2 mm, said wide and narrow portions being alternately arranged and extending over the entire depth P of the incision.

The patent application EP3640058 discloses a sipe formed in a block of a pneumatic tire which includes a first inclined portion inclined against a tire radial direction, a second inclined portion formed at an outer side in the tire radial direction with respect to the first inclined portion and inclined in a direction opposite to the first inclined portion with respect to the tire radial direction, a bent portion communicated with the first inclined portion and the second inclined portion and bent to be protruded toward a direction in which a gap between the first inclined portion and the second inclined portion becomes narrow, and a widened portion formed at an inner side in the tire radial direction with respect to the first inclined portion and widened in a groove width more than the first inclined portion. The cross section of such sipe is a kind of a zig-zag pattern in the height direction. At the bottom of the zig-zag pattern is the widened portion.

The patent application FR3019096 discloses a tread for a tire comprising at least two grooves of general circumferential orientation delimiting intermediate parts and edge parts, these orientation grooves generally circumferential being shaped to be present at least until the wear limit of the tread is reached, this tread comprising a tread surface. The tread comprises on its edge regions a plurality of cutouts for orientation generally transverse and of suitable depth to be present up to the wear limit of the tread, each cutout of general transverse orientation being formed of a first part opening onto the running surface and extended towards the inside of the strip by a hollow part forming a channel of average width greater than the average width of the groove.

The international patent application WO02060705 relates to a tyre tread comprising a tread profile formed by numerous relief patterns defined by grooves which are oriented in the transversal and longitudinal directions of the tread. Each of said relief patterns comprises one contact face and lateral faces.

The international patent application WO2018083414 discloses a tread for a pneumatic tire, comprising a long tread bar extending in a circumferential direction and comprising a contact surface that comes into contact with the ground, a first and a second side wall defining said contact surface, the long tread bar comprising a plurality of incisions which each have a first and a second end. The incisions (n, n+1) are successively arranged longitudinally on the contact surface in such a way that when an incision reaches its second end, another incision starts, at the same circumferential level on the long tread bar. Furthermore, from a certain depth in the tread, the incisions at least partially widen.

SUMMARY

An object of the invention is to improve the properties of a pneumatic tire provided with lamellas and sipes in the tread block so that lamellas can work more efficiently in the sense of improved gripping and improved stability despite of wear of a surface of the tread band.

Accordingly, a tread block arrangement is disclosed. The tread block arrangement is suitable for a tire or for a tread band for a tire. The tread block arrangement comprises tread blocks. A tread block limits a first sipe. The first sipe comprises deep parts separated by shallow parts. This has the effect that, because of the shallow parts, the first sipe does not significantly affect the stiffness of the tread block in which the first sipe is arranged. However, because of the deep parts, the first sipe may absorb some water of the surface, which improves the grip also near the first sipe. Moreover, to provide for sufficient stiffness, a depth of a deep part is at least three times a depth of a shallow part. Furthermore, because the first sipe preserves the stiffness of the tread block, it is possible to make a longer and/or a wider sipe, whereby the space for the water absorption may be increased. Each deep part is limited by two end walls, which are not parallel such that the deep part becomes longer when moving from bottom towards the tread. Thus, at least one of the end walls of the deep parts is inclined relative to a radial direction.

According to a first aspect there is provided a tread block arrangement suitable for a tire or for a tread band for a tire, the tread block arrangement comprising:

a tread block comprising at least a first sipe delimited by
a first sipe wall, a second sipe wall and a bottom of the sipe, wherein the first sipe wall and the second sipe wall are arranged parallel to each other and define a width of the sipe, further wherein at least the first sipe wall has at least one indentation to increase an empty volume of the sipe at the location of the indentation, wherein the first sipe wall has an inclined section to form said at least one indentation, wherein a distance between the first sipe wall and the second sipe wall increases towards the bottom of the sipe at the location of the inclined section, and in the longitudinal direction of the inclined section the height of the inclination differs so that at one end of the inclined section the inclination starts at or near a top of the tread block and the inclination starts more and more deep in the sipe towards the other end of the inclined section.

According to a second aspect there is provided a tire for a vehicle, the tire having a tread block arrangement comprising:

a tread block comprising at least a first sipe delimited by a first sipe wall, a second sipe wall and a bottom of the sipe, wherein the first sipe wall and the second sipe wall are arranged parallel to each other and define a width of the sipe, further wherein at least the first sipe wall has at least one indentation to increase an empty volume of the sipe at the location of the indentation, wherein the first sipe wall has an inclined section to form said at least one indentation, wherein a distance between the first sipe wall and the second sipe wall increases towards the bottom of the sipe at the location of the inclined section, and in the longitudinal direction of the inclined section the height of the inclination differs so that at one end of the inclined section the inclination starts at or near a top of the tread block and the inclination starts more and more deep in the sipe towards the other end of the inclined section.

According to a third aspect there is provided a lamella plate for forming a sipe to a tread block arrangement suitable for a tire or for a tread band for a tire, the lamella plate comprising:

a first surface for forming a first wall of the sipe;
a second surface opposite to the first surface for forming a second wall of the sipe; and
a bottom edge for forming a bottom of the sipe,
wherein the distance between the first surface and the second surface defines a thickness of the lamella plate and a width of the sipe,
wherein the lamella plate further comprises one or more expanded sections for forming at least one inclined section at least to the first wall of the sipe, wherein the thickness of the lamella plate increases towards the bottom edge of the lamella plate at the location of the one or more expanded sections, and
the expanded section has a first side and a hypotenuse forming an angle for forming the inclined section so that in the longitudinal direction of the inclined section the height of the inclination differs so that at one end of the inclined section the inclination starts at or near a top of the tread block and the inclination starts more and more deep in the sipe towards the other end of the inclined section.

The dependent claims disclose preferable embodiments. The description explains these embodiments and discloses further embodiments.

DETAILED DESCRIPTION

In this description at least the following terms are used:

A sipe refers to a narrow groove provided in a tread block of a tire.

A lamella plate refers to a plate that is usable for forming a sipe in a moulding process. Thus, when a lamella plate is embedded to uncured rubber, and removed therefrom after curing the rubber, the shape of the sipe formed by the lamella plate is geometrically congruent with the lamella plate.

A lamella refers to a part of rubber arranged in between two sipes.

As is well known, a tire comprises a tread. The tread is formed of multiple tread blocks, including a first tread block and a second tread block. Each tread block may comprise a number of sipes, such as a primary sipe and a secondary sipe. Thus e.g. a first tread block may limit a primary first sipe and a secondary first sipe. Moreover, a (primary, secondary, etc.) sipe is arranged between two walls, the walls being comprised by the (first, second, etc.) tread block. These side walls are called as first and second walls. When they concern e.g. a primary sipe, they are called a first primary wall and a second primary wall. Similar notation and/or numbering is also used for some other parts of the tire.

In the following, the primary sipe, the secondary sipe, etc. as well as the first sipe, the second sipe etc. are generally called as the sipe or the primary sipe/secondary sipe, unless otherwise indicated, because the general principles of at least some embodiments are applicable to different sipes irrespective of where in the tire they are located. However, a tire may also have sipes which do not correspond with the structure of the sipes of embodiments of the invention. Such sipes are also called as secondary sipes in this specification.

FIG. 1a shows a pneumatic tire 100 having a tread block arrangement 200 forming a tread 170 of the tire 100. The tread 170 of the tire 100 (or a tread band 150) refers to the part that makes contact with a base 900 such as a ground surface (e.g. a road or the ground) when in use. The tread 170 is meant for a rolling contact against the base 900. The tread 170 is the outermost surface of the tread block arrangement 200. The tread block arrangement comprises tread blocks 210, i.e. blocks, as will be detailed below.

Figure 1B:
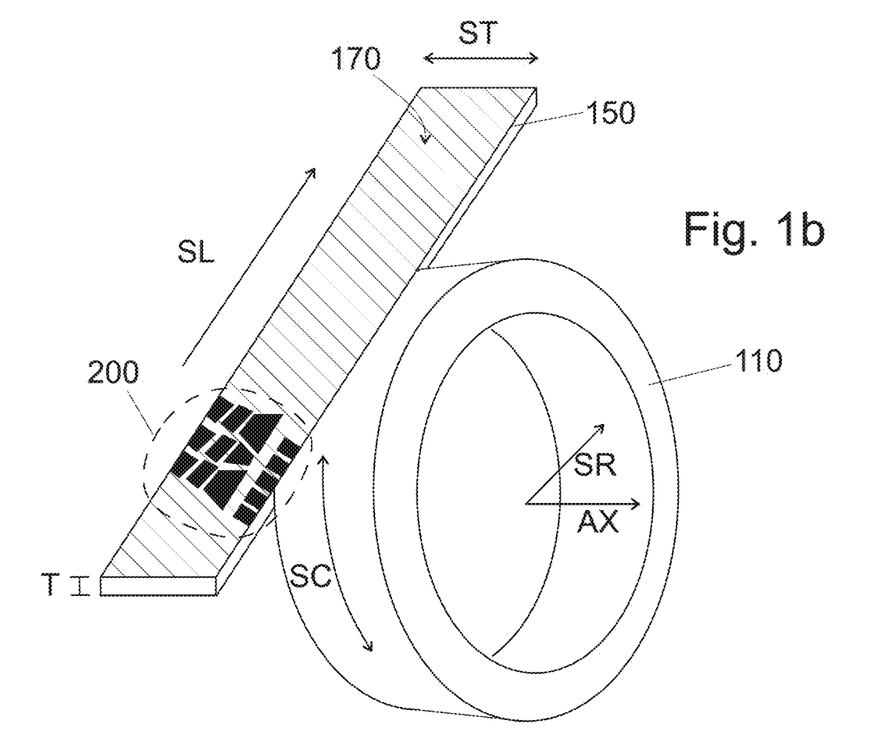
FIG. 1b shows applying a tread band onto a preform of a tire.

The circumferential direction of the tire 100 is indicated by the arrow R in FIG. 1a and with the arrow SC in FIG. 1b. The axial and radial directions of the tire 100 are indicated by the AX and SR, respectively. The tread block arrangement 200 can be formed onto the tire 100 e.g. in a moulding process. As an alternative to moulding, the tread 170 of a tire can be made by applying a tread band 150 onto a preform 110 of a tire to form the tire 100 with the tread 170. Referring to FIG. 1b, the tread band 150 may be a band extending in a longitudinal direction SL. Herein the longitudinal direction SL is perpendicular to a transversal direction ST and perpendicular to the thickness T of the tread band 150. Moreover, the band 150 is applied such that the transversal direction ST of the band is applied parallel to the axial direction AX of the tire (see FIG. 1c). Within the tire 100, the longitudinal direction SL (See FIG. 1b) of the tread block arrangement is parallel to the circumferential direction SC of the tire 100; and curves along the circumferential direction SC when the tread block arrangement 200 is on a tire. Moreover, the longitudinal direction of the tread block arrangement, i.e. the circumferential direction SC, is perpendicular to a transversal direction AX and perpendicular to the thickness T (see FIGS. 1b and 1c) of the tread block arrangement 200. The thickness T is, on a tire, substantially parallel to the radial direction SR. The tread 170 of the tread band 150 faces outwards, and forms the tread 170 of the tire 100. In this way, the tread band 150 also comprises a tread block arrangement 200 forming the tread 170.

Figure 1C:
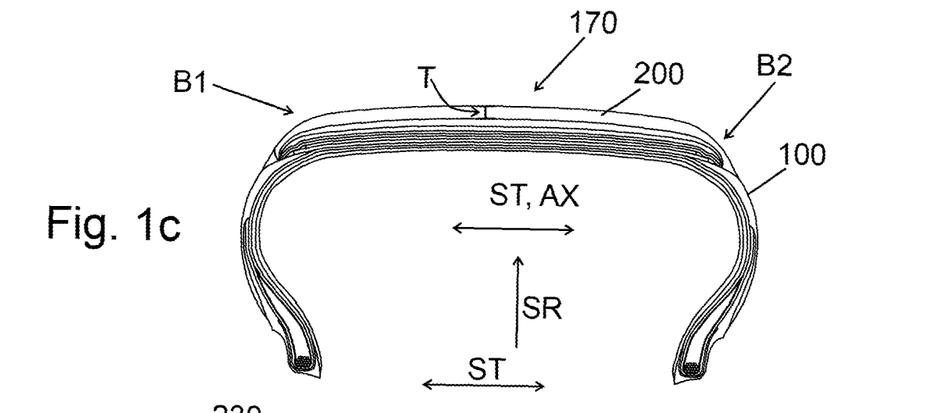
FIG. 1c shows half of a cross-section of a tire.

FIG. 1c shows a half of a cross section of the pneumatic tire 100. The tread 170 includes a primary boundary B1 and a secondary boundary B2 of the tread block arrangement 200, and the tread 170 is located in between these boundaries. The transversal direction ST is parallel to the axial direction AX. The radial direction SR is substantially parallel to a normal of a the tread 170, and parallel to the thickness T of the tread block arrangement 200 (or the tread band 150, if applicable). The circumferential direction SC is perpendicular to the plane of FIG. 1c (see also FIGS. 1a and 1b).

The longitudinal direction of the tread block arrangement 200 is parallel to the longitudinal direction SL of the tread band 150 or parallel to the circumferential direction SC of the pneumatic tire 100; depending on whether the arrangement 200 is a part of the tread band 150 or the pneumatic tire 100. The longitudinal direction (SL, SC) may refer to either of the longitudinal directions in this disclosure unless indicated otherwise. The transversal direction (ST, AX) of the tread block arrangement 200 is parallel to the transversal direction ST of the tread band 150 or parallel to the axial direction AX of the pneumatic tire 100, depending on whether the arrangement 200 is part of the tread band 150 or the pneumatic tire 100. The thickness of the tread block arrangement 200 is parallel to the radial direction SR of the pneumatic tire 100 or the thickness of the tread band 150.

Figure 2A:
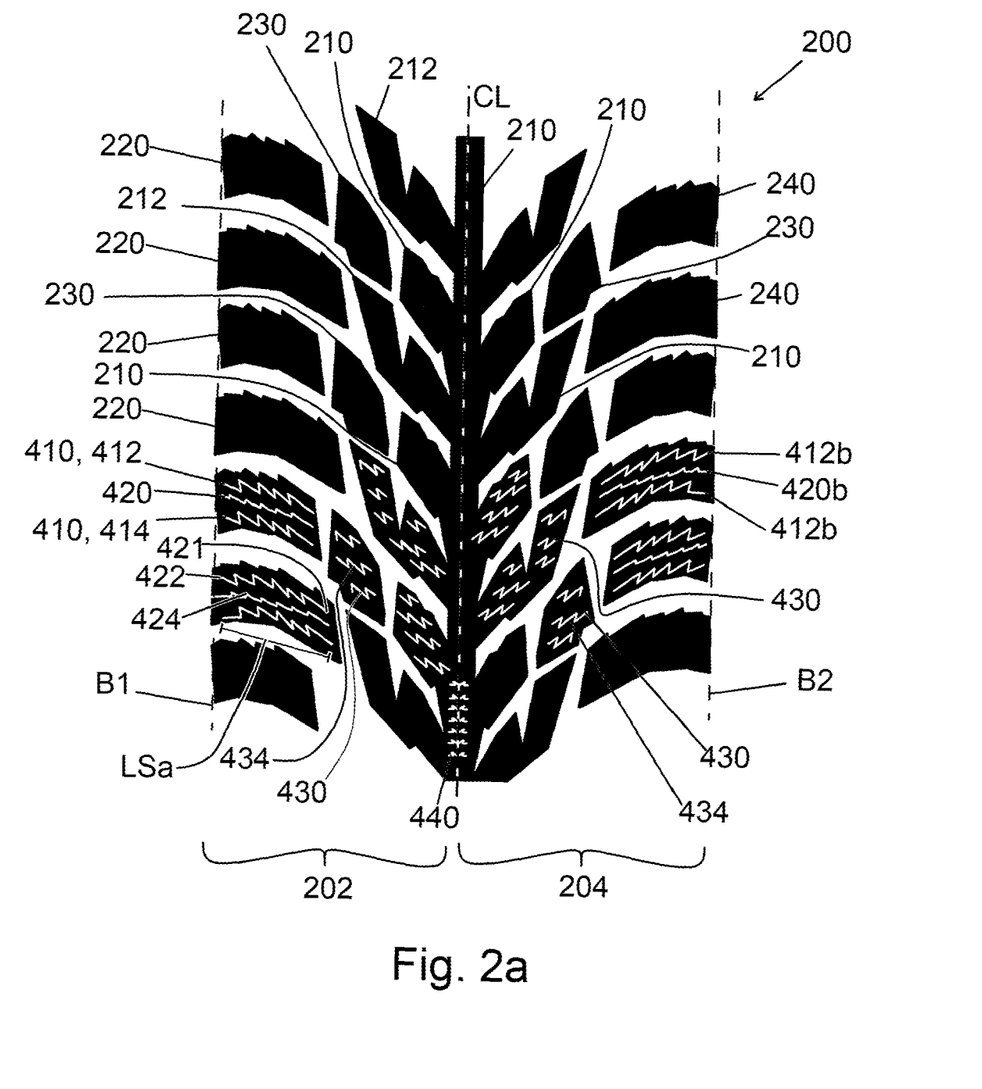
FIG. 2a shows, as a top view, a part of a tread block arrangement having sipes.

FIG. 2a shows a part of a tread block arrangement 200 of a pneumatic tire 100 in more detail. The tread block arrangement 200 comprises tread blocks 210, 220, 230, 240. In this description, a block refers to a tread block. Referring to FIG. 2a, a tread block arrangement 200 may comprise shoulder blocks 220, 240, middle blocks 210 and intermediate blocks 230. In this description, a block refers to a part of the tread block arrangement 200 that is separated from other blocks of the tread block arrangement 200 by a portion of a groove. In this way, a block protrudes in the radial direction SR from a bottom of the grooves. A groove has a depth and a width. The depth of a groove may be at least 6 mm, such as at least 8 mm, such as from 6 mm to 50 mm. The width of a groove may be more than 3 mm, such as more than 4 mm. The width of the groove refers to a dimension that is perpendicular to the depth and a length of the groove, wherein the length of the groove is greater than the width of the groove, and the depth is parallel to a thickness T of the tread. A width of a groove may be e.g. at most 100 mm, such as at most 20 mm. In particular, a tread block arrangement comprises primary shoulder blocks 220 defining a primary boundary B1 of the tread block arrangement 200 (See. FIG. 2a).

The dimensions of the grooves mentioned above refer to a new tire which has not been in use, but at least the depth of the grooves decreases when the tire is in use.

Figure 2B:
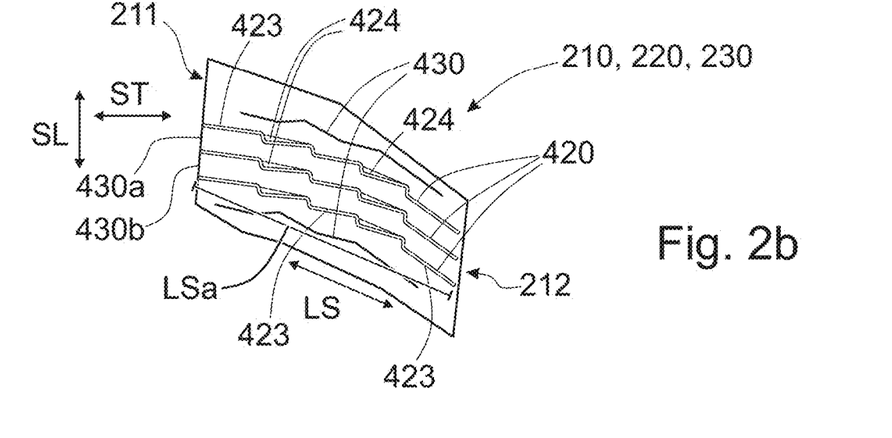
FIG. 2b shows, as a simplified top view, an example of a tread block having primary sipes and secondary sipes.

As indicated in FIGS. 2a and 2b, a tread block 210, 220, 230 limits a plurality of primary sipes 420. The primary sipe 420 extends in a longitudinal direction LS of the primary sipe 420 a longer distance than in a direction of width or depth of the primary sipe 420. The longitudinal direction LS of the primary sipe 420 is indicated in FIG. 2b. If a cross-section of the primary sipe 420 has a shape of a zig-zag in the longitudinal direction, as it may have, the longitudinal direction LS follows the shape of the sipe 420, as shown in FIG. 2b. However, an average longitudinal direction LSa can be defined to extend in between the two ends of the primary sipe 420. As an alternative, the primary sipe 420 may have a straight shape or a curved shape instead of a zig-zag.

As indicated in FIGS. 2a and 2b, the average longitudinal direction LSa of the sipe may be transversal or substantially transversal with respect to the longitudinal direction SL of the tread band 150. For example, the average longitudinal direction LSa of the primary sipe 420 may form an angle of at most 80 degrees with a transversal direction ST, AX of the tread block arrangement 200.

It should be noted that FIG. 2a shows only some tread blocks having sipes but in practical implementations one or more sipes are formed to a majority of the tread blocks 210, 220, 230 or even to each tread block 210, 220, 230 of the tire 100.

In an embodiment, the tread block arrangement 200 comprises a primary part 202 and a secondary part 204. The primary part 202 refers to that part of tread block arrangement 200 that is left in between the longitudinal central line CL and the primary boundary B1. The secondary part 204 refers to that part of tread block arrangement 200 that is left in between the longitudinal central line CL and the secondary boundary B2.

FIG. 2b shows one tread block 210, 220, 230 as a top view, according to an example of the invention. The tread block 210, 220, 230 comprises three primary sipes 420, but it is possible that a tread block 210, 220, 230 can have only one or two primary sipes or more than three primary sipes 420. It may also be possible that some tread blocks are without any sipes 420 or have only secondary sipes 430.

The primary sipes 420 of the tread block 210, 220, 230 of FIG. 2b extend from one edge 211 of the tread block to the other edge 212 of the tread block 210, 220, 230. In other words, one end 421 of the primary sipe 420 coincides one edge 211 of the tread block and another end 422 coincides the other edge 212 of the tread block, preferably in the longitudinal direction of the tread block. However, the primary sipes 420 may also be formed so that they are totally within the tread block and do not continue to either edge of the tread block, or that only one end of the primary sipe continues to an edge 211, 212 of the tread block 210. In that case, water and slush removal efficiency of the primary sipes may not be so high than when at least one end of the primary sipes stretches to an edge of the tread block, as is illustrated in FIG. 2b.

In FIG. 2b the primary sipes 420 have flat sections 423 and inclined sections 424. The inclined sections 424 form at least one indentation 428 to the primary sipe 420, wherein a distance between the first sipe wall 425 and the second sipe wall 426 (FIG. 2c) increases towards the bottom 427 of the sipe at the location of the inclined section 424, but the width of the primary sipe 420 at both ends 421, 422 in a longitudinal direction of the sipe is without the indentations. The indentations are not normally visible when the tread band is looked at the top but may become partly or totally visible when the tire wears. FIGS. 4b and 4c illustrate this showing a part of the tread band of a new tire (FIG. 4b) and a corresponding part of a worn tire (FIG. 4c).

Figure 2C:
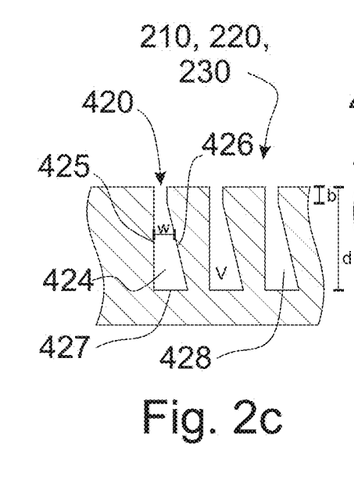
FIGS. 2c, 2d and 2e show examples of cross sections of different kinds of primary sipes having indentations.
Figure 2D:
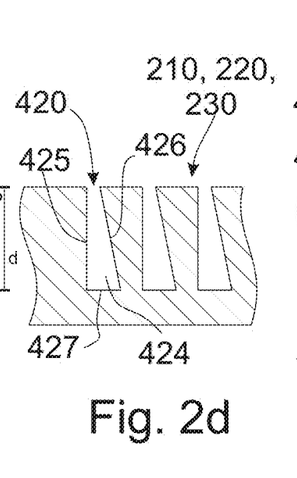
Figure 2E:
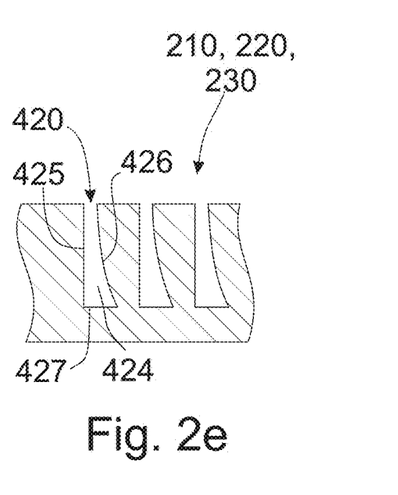

The cross sections of a tread block of the examples shown in FIGS. 2c, 2d and 2e are illustrative only and they are not drawn in scale and they are not showing possible details behind the cross section. FIG. 2c depicts an example where the inclined section 424 does not start immediately at the top of the surface of the tread block 210 but at a distance b from the surface of the tread block 210. Hence, the width w of the sipe may first be substantially constant and starts to increase at the location where the inclined section 424 starts. FIG. 2d depicts an example where the inclined section 424 starts immediately at the top of the surface of the tread block 210. FIG. 2e depicts an example where the wall 426 of the inclined section 424 is slightly curved in the vertical direction and possibly also in the horizontal direction wherein the surface of the wall 426 of the inclined section 424 is at least partly convex. The indentation increases an empty volume V of the sipe 420 at the location of the indentation.

Figure 3A:
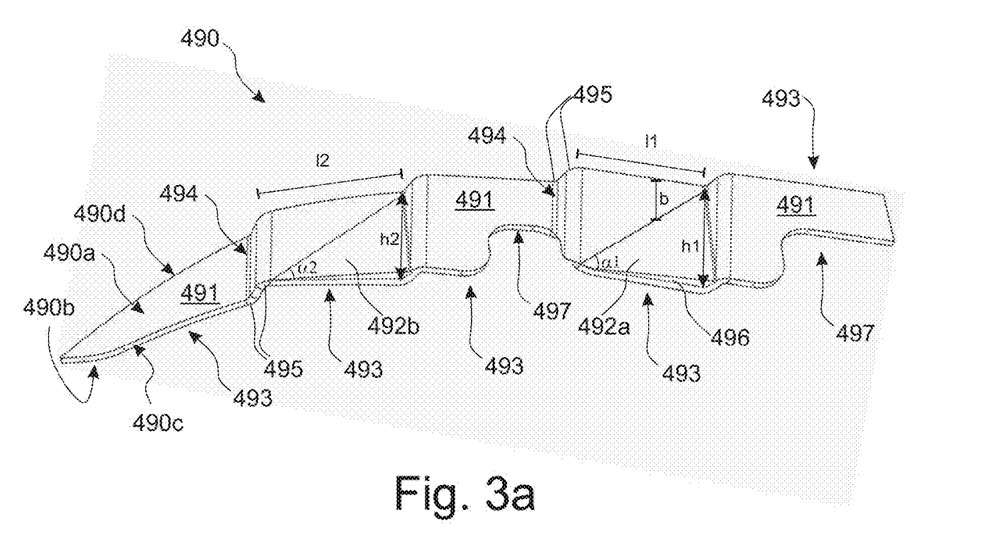
FIG. 3a shows as a perspective view an example of a lamella plate forforming the primary sipes, in accordance with an embodiment of the invention.
Figure 3B:
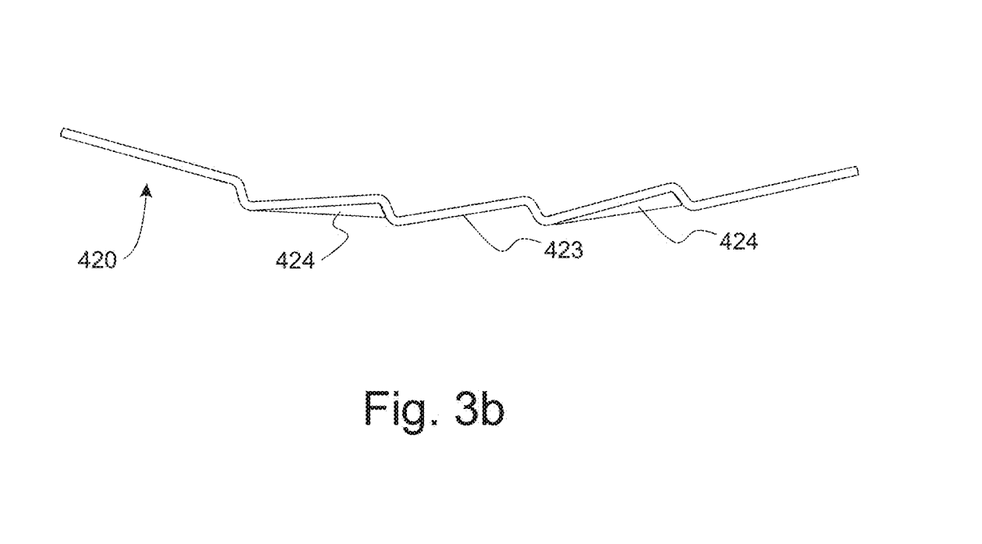
FIG. 3b shows as a top view an example of a primary sipe formed by the lamella plate of FIG. 3a, in accordance with an embodiment of the invention.

In accordance with some examples of the invention the indentation of the inclined section 424 can also be formed in such a way that in the longitudinal direction of the inclined section 424 the height of the inclination differs e.g. so that at one end of the inclined section 424 the inclination starts at or near the top of the tread block (i.e. the distance b is 0 or almost zero) and when proceeding towards the other end of the inclined section 424 the inclination starts more and more deep in the sipe (i.e. the distance b increases being the same or almost the same than the depth d of the sipe). This kind of sipe is illustrated in FIG. 3b and a lamella plate 490 for forming such a sipe is illustrated in FIG. 3a. As can be seen from FIG. 3a the indentation forms a kind of a sail.

It should be noted that the depth d of the sipe need not be constant but may vary in the longitudinal direction of the sipe. Respectively, the height h of the lamella plate 490 may vary in the longitudinal direction. For example the example of the lamella plate 490 in FIG. 3a shows two locations 497 in which the bottom edge of the lamella plate 490 (i.e. the lower edge in the figure) is narrower (the height h is smaller) than at other parts of the lamella plate 490. This has the consequence that the bottom of the sipe is lower at the corresponding locations. This may improve the stiffness of the lamellas between two adjacent sipes.

As an example, the depth of the lower (shallow) parts of the primary sipe (and the narrower parts 497 of the lamella plate 490) s from 0.1 mm to 2 mm, preferably from 0.15 mm to 1.0 mm, more preferably from 0.2 mm to 0.5 mm. The depth is preferably as small as practically possible, keeping in mind that a corresponding flat part of the lamella plate 490 requires some strength to join the tall parts. As an example, the depth of the shallow parts may be 0.3 mm, when the lamella plate 490 is made from steel. In an embodiment, the depth of both of the deep parts are from 5 mm to 15 mm, preferably from 6 mm to 8 mm. Typically the deep parts are somewhat shallower than the grooves. This also improves the stiffness of the tread blocks, while maintaining the water drainage properties of the grooves. As an example the depths of both of the deep parts are at most 90% of a depth of a groove of the tire. A depth of the grooves may be e.g. from 6 mm to 50 mm, such as from 6 mm to 15 mm, such as from 7 mm to 10 mm.

When considering the shoulder blocks 220 i.e. those blocks at the edges of the tire 100, one edge of the tread block may end to a groove and the opposite end of the tread block may end to the edge of the tire. On the other hand, when considering the middle blocks 210 and intermediate blocks 230, i.e. those blocks between the shoulder blocks in the axial direction AX of the tire 100, both edges of the tread block 210, 230 may end to a groove in the tread.

Such a primary sipe 420 has the effect that, because of the shallow part (or shallow parts), the primary sipe 420 does not significantly affect the stiffness of the tread block, in which the primary sipe 420 is arranged. The stiffness is not significantly affected, since the shallow part or shallow parts bind the neighbouring lamellas 430a, 430b together, whereby the stiffness remains intact. The term "lamella" refers to the rubber material in between two neighbouring sipes or in between a sipe and a groove. A lamella 430 is typically relatively thin, e.g. from 1 mm to 7 mm, the thickness referring to the distance in between the sipes (or the sipe and groove) defining the lamella. Advantageously the lamella is from 3 to 7 mm, preferably from 4 to 6 mm thick. The aforementioned neighbouring lamellas 430a, 430b are the two lamellas, in between which the primary sipe 420 (and only the primary sipe 420) is left. FIG. 2b shows an example of the first lamella 430a and the second lamella 430b. Hence, a wall of the first lamella 430a forms the first sipe wall 425 and a wall of the second lamella 430b opposite to the wall of the first lamella 430a forms the second sipe wall 426, wherein a distance between the first lamella 430a and the second lamella 430b defines the width of the first sipe 420, and a height of the first lamella 430a and the second lamella 430b define a height of the first sipe 420.

The primary sipes 420 can be manufactured, for example, by using the above mentioned lamella plate 490, an example of which is depicted in FIG. 3a. In practice, a plurality of such lamella plates 490 shall be used in manufacturing of a tire 100, but it is sufficient to describe the process using one lamella plate 490 as an example. The lamella plate 490 is inserted into the tire 100 or tread band 150 during vulcanization of the polymer material, e.g. rubber, of the tread 170. After vulcanization, the lamella plate 490 may be removed from the tire 100 or the tread band 150. Referring to FIG. 3a, the lamella plate 490 comprises flat sections 491 and expanded sections 492. When the primary sipe 420 is formed, the expanded sections 492 of the lamella plate 490 form the inclined sections 424.

In the following, some details of the lamella plate 490 of FIG. 3a and the corresponding primary sipe 420 will be described in more detail.

In this example the lamella plate 490 forms a kind of a zig-zag pattern in the longitudinal direction. In the following, some terms regarding the zig-zag pattern are described. The zig-zag pattern has longer parts 493 (wider sections) and shorter parts 494 (narrower sections) at an angle with respect to each other. According to an example the angle is about 90°-120° but can be different from that. The locations where one longer part 493 and one shorter part 494 are joined, can be called as a corner 495 or a turning point or a knee or a deflection point. Different corners 495 may have different angles. In the example of FIG. 3a three of the longer parts 493 form three flat sections 491 and two of the longer parts form the expanded sections 492 so that every other longer part 493 has the expanded section 492. The expanded sections have been formed so that there is an insert or add-on part 496 attached with the longer part 493.

The lamella plate 490 has a first surface 490a for forming the first wall 424 of the sipe 420 and a second surface 490b (not visible on FIG. 3a) opposite to the first surface 490a for forming the second wall 426 of the sipe 420 and a bottom edge 490c for forming the bottom of the sipe. The distance between the first surface 425 and the second surface 426 of the sipe 420 defines a thickness of the lamella plate 490 and a width w of the sipe 420.

In accordance with an embodiment of the lamella plate 490, a top of the expanded section 492 is below a top edge 490d opposite to the bottom edge 490c of the lamella plate 490, a bottom of the expanded section 492 is at a bottom edge 490c of the lamella plate 490, and a thickness of the lamella plate 490 is constant at the top edge 490d.

Alternatively, the lamella plate 490 may be formed by a moulding process using a mould, wherein the mould has formed so that it follows the desired form of the lamella plate 490 as a mirrored image. In other words, the form of the mould could be similar to the form of the primary sipe. Another alternative is to use a punching process in which an appropriately designed tool (a punch) of a punch press is forced through a sheet of an appropriate material such as metal, wherein the tool forces a piece of the sheet to the desired form and separates the lamella plate from the sheet.

In the example of FIG. 3a the add-on parts 496 are kind of triangles having two sides and a hypotenuse. A first side of the triangle (a.k.a. the base of the triangle) substantially corresponds the length of the respective longer part 493 and a second side of the triangle (a.k.a. the height of the triangle) substantially corresponds the height h of the respective longer part 493. In the example of FIG. 3a a first add-on 492a has the length l1 and height h1 and a second add-on 492b has the length l2 and height h2. The first side and the hypotenuse form an angle α1 in the first add-on 492a and α2 in the second add-on 492b as is indicated in FIG. 3a.

It should be noted that the length of the add-on 492 (the length of the extended section) need not correspond with the length l of the longer part 493 of the lamella plate 490, but can also be shorter. Respectively, the height of the add-on 492 (the width of the extended section) need not correspond with the height h of the longer part 493 of the lamella plate 490, but can also be lower.

In accordance with an example, the first angle α1 may be about 39° and the second angle α2 may be about 35°. If the height of the first add-on 492a changes ±1.0 mm and the length changes ±1.5 mm, the first angle α1 may vary between 30° and 47°. If the height of the second add-on 492a changes ±1.0 mm and the length changes ±1.5 mm, the second angle α2 may vary between 26° and 45°. It should be noted that these figures are just example of how changes in the height and/or length may affect to the angles α1 and α2.

If the tire 100 will also have secondary sipes which do not have the inclined sections they can be formed in the same way by utilizing a lamella plate designed for that purpose (not shown).

As an alternative for using the lamella plates 490 in the manufacturing of the sipes to a tire 100, a moulding process may be utilized. In that case a mould having a mirror image of the intended form of the tire 100 (including the grooves and sipes) is formed.

The sipe 420 made by the lamella plate 490 has the same form as the lamella plate 490 but as a mirrored image. Hence, if the inclined sections of the primary sipe should be convex, the expanded sections of the lamella plate are respectively concave, The primary sipes 420 are transversal sipes. A transversal sipe 420 extends in an average longitudinal direction LSa that forms an angle of at most 80 degrees with the transversal direction ST, AX of the tread block arrangement 200. What has been said above about the longitudinal direction LS and the average longitudinal direction LSa of the primary sipe 420 applies to also to directions of other sipes, mutatis mutandis.

In an embodiment, at least half of the primary shoulder blocks 220 are provided with primary sipes 420 as discussed above for one of the primary shoulder blocks 220. Thus, in an embodiment, at least half of the primary shoulder blocks 220 are provided with a primary sipe 420.

In an embodiment, all the primary shoulder blocks 220 are provided with primary sipes 420 as discussed above for one or more of the primary shoulder blocks 220. Thus, in an embodiment, all the primary shoulder blocks 220 are provided with a primary sipe 420.

Figure 4A:
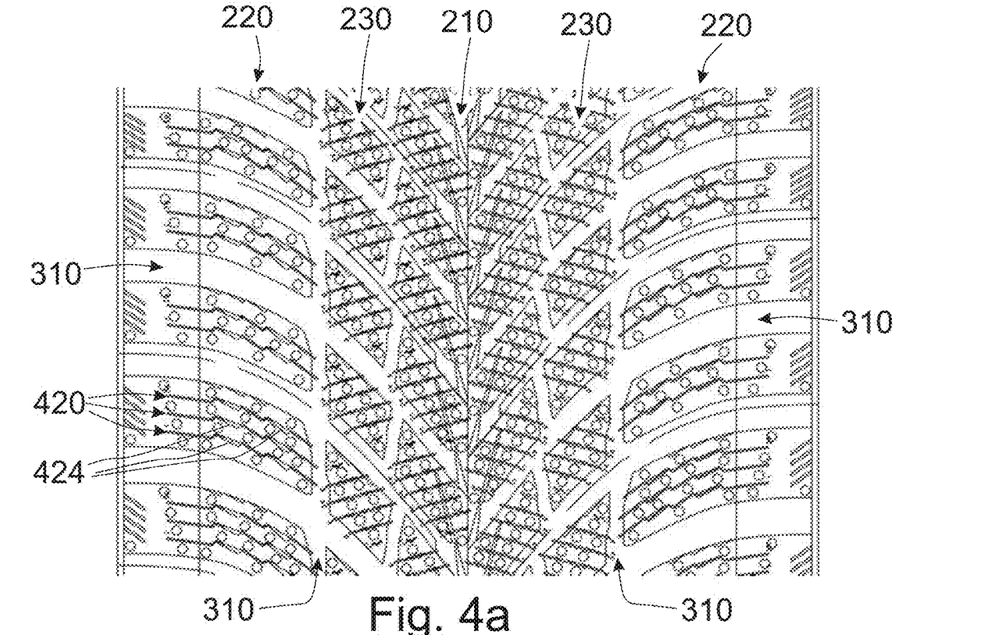
FIG. 4a shows, as a top view, a part of another tread block arrangement having sipes.
Figure 4B:
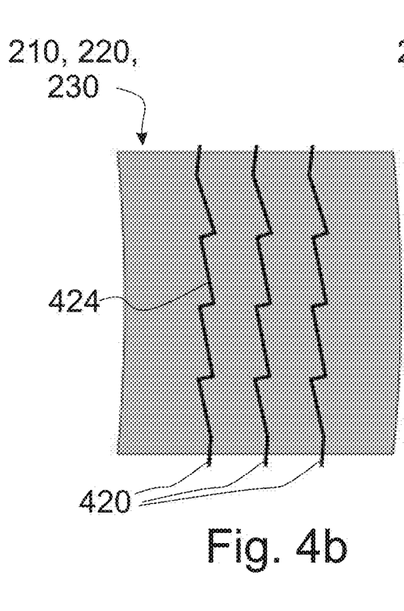
FIG. 4b shows, as a top view, a part of the tread band of a new tire comprising the primary sipes of FIG. 3b.
Figure 4C:
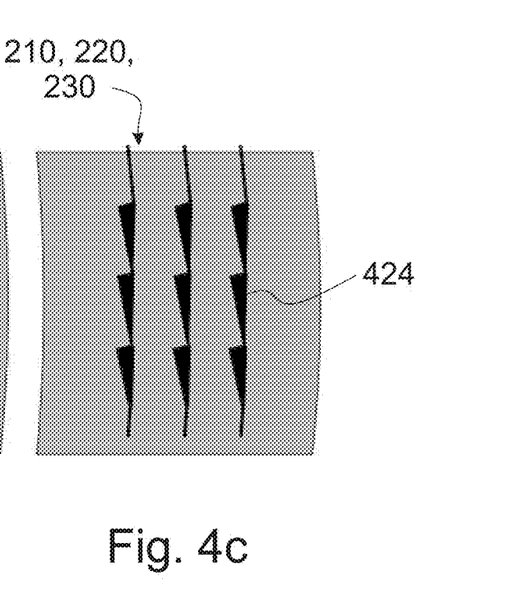
FIG. 4c shows, as a top view, the part of the tread band of a worn tire of FIG. 4b.

FIG. 4a shows another example of a part of a tread block arrangement 200 of a tire 100. In this example the tread block arrangement 200 comprises shoulder blocks 220, middle blocks 210 and intermediate blocks 230.

Referring to FIG. 2a, a tread 170 typically comprises also secondary shoulder blocks 240 defining a secondary boundary B2 such that a central line CL is left in between the primary boundary B1 and the secondary boundary B2. FIG. 2a shows the primary shoulder blocks 220 and the secondary shoulder blocks 240 in addition to the primary boundary B1 and the secondary boundary B2, and the central line CL. In addition the curved line CP denotes a central part of the tread 170 irrespective of its details. The central part CP comprises blocks.

In an embodiment, at least half of the secondary shoulder blocks 240 are provided with primary sipes 420, and at least the secondary sipes 420b for one of the secondary shoulder blocks 240. In an embodiment, all the secondary shoulder blocks 240 are provided with primary sipes 420, at least the secondary sipes 420b for one or more of the secondary shoulder blocks 240.

As indicated above, each block 210, 220 of the tread block arrangement 200 is separated from another block 210, 220 of the tread block arrangement 200 by a portion of a groove pattern 310.

In accordance with an embodiment of the invention a top of the inclined section 424 is below a top of the sipe 420 and a bottom of the inclined section is at the bottom 427 of the sipe.

In accordance with an embodiment of the invention the distance between the first sipe wall 425 and the second sipe wall 425 is constant at the top of the sipe 420 in a longitudinal direction LS of the sipe 420.

In accordance with an embodiment of the invention the first sipe wall 425 has a plurality of inclined sections 424 to form a plurality of indentations 428.

In accordance with an embodiment of the invention both the first sipe wall 425 and the second sipe wall 426 have one or more inclined sections 424.

In accordance with an embodiment of the invention the tread block arrangement 200 comprises at least a first lamella 430a and a second lamella 430b, wherein a wall of the first lamella 430a forms the first sipe wall 425 and a wall of the second lamella 430b opposite to the wall of the first lamella 430a forms the second sipe wall 426. A distance between the first lamella 430a and the second lamella 430b defines the width w of the first sipe 420, and a height of the first lamella 430a and the second lamella 430b define a height h of the first sipe 420.

In accordance with an embodiment of the invention the top of the sipe forms a zig-zag pattern and the bottom 427 of the sipe forms a series of triangles.

In accordance with an embodiment of the invention the inclined section 424 starts from a predetermined distance greater than zero from the top of the sipe 420.

In accordance with an embodiment of the invention a surface of the inclined section 424 is flat or convex.

In accordance with an embodiment of the invention the first sipe wall 425 and the second sipe wall 426 have a plurality of indentations 424 so that indentations of the first sipe wall 425 and indentations of the second sipe wall 426 are located in an alternating manner in a longitudinal direction LS of the sipe 420.

In accordance with an embodiment of the invention a width w of the sipe 420 at both ends in a longitudinal direction LS of the sipe 420 is without the indentations, wherein a width w of the sipe at both ends is constant.

In accordance with an embodiment of the invention a width w of the sipe 420 at the location of the indentations 424, which are visible from the top of the sipe 420, are indicative of weariness of the tread block arrangement 200.

In accordance with an embodiment of the invention the tire 100 comprises a plurality of tread blocks 210, 220, 230, 240 around a circumference of the tire 100.

In accordance with an embodiment of the invention only a part of the plurality of tread blocks 210, 220, 230, 240 of the tire 100 comprises sipes 420 having inclined sections 424.

In accordance with an embodiment of the invention the tire 100 comprises shoulder tread blocks 210, 240 at both edges of the tread block arrangement 200, and middle tread blocks 210 between the shoulder tread blocks in a transversal direction of the tread block 200 arrangement with respect to the circumferential direction SC of the tire 100, wherein only the shoulder tread blocks 210, 240 comprise sipes 420 having inclined sections 424.

In accordance with an embodiment of the invention a top of the expanded section 492 of the lamella plate 490 is below a top edge 490d opposite to the bottom edge 490c of the lamella plate 490, a bottom of the expanded section 492 is at a bottom edge 490c of the lamella plate 490, and a thickness of the lamella plate 490 is constant at the top edge 490d.

In accordance with an embodiment of the invention the distance between the first sipe wall 425 and the second sipe wall 426 is constant at the top of the sipe 420.

In accordance with an embodiment of the invention the lamella plate 490 comprises a plurality of deflection points 495 so that the deflection points 495 form a zig-zag pattern having narrower sections 494 and wider sections 493, wherein the expanded sections 492 are located in one or more of the wider sections 493.

In accordance with an embodiment of the invention the expanded sections 492 of the lamella plate 490 are located in every other of the wider sections 493, wherein there is one wider section 493 without the expanded section 492 between each two wider section 493 having the expanded section 492. An example of this is illustrated in FIG. 3a in which the lamella plate 490 has the first add-on 492a in the second wider section 493 (from the left in the arrangement of FIG. 3a), the next (third) wider section 493 in the longitudinal direction being without the add-on, and the next (fourth) wider section 493 having the second add-on 492b.

In accordance with an embodiment of the invention the lamella plate 490 comprises wider sections 493 at both ends of the lamella plate, wherein the wider sections 493 at both ends of the lamella plate 490 are without the expanded sections 492.

In accordance with an embodiment of the invention a surface of the expanded section 492 of the lamella plate 490 is flat or concave.

The invention claimed is:

1. A tread block arrangement for a tire or for a tread band for a tire, the tread block arrangement comprising:
   a tread block comprising a sipe delimited by a first sipe wall, a second sipe wall and a bottom of the sipe, wherein the first sipe wall and the second sipe wall are arranged parallel to each other and define a width of the sipe, wherein at least the first sipe wall has at least one indentation to increase an empty volume of the sipe at a location of the indentation,
   wherein the first sipe wall has an inclined section to form said at least one indentation, wherein a distance between the first sipe wall and the second sipe wall increases towards the bottom of the sipe at a location of the inclined section, and
   wherein in a longitudinal direction of the inclined section a height of inclination differs so that the inclination starts deeper in the sipe from one end towards an other end of the inclined section;
   wherein a top of the sipe forms a zig-zag pattern and the bottom of the sipe forms a series of triangles;
   wherein the sipe comprises a first part having a first depth, and a second part having a second depth less than the first depth, wherein portions of the first part are separated by the second part so that a depth of the sipes varies in a longitudinal direction of the sipe;
   wherein a top of the inclined section is below a top of the sipe, and a bottom of the inclined section is at the bottom of the sipe; and
   wherein the distance between the first sipe wall and the second sipe wall is constant at the top of the sipe in the longitudinal direction of the sipe throughout an entire length of the sipe.

2. The tread block arrangement according to claim 1, wherein the first sipe wall has a plurality of inclined sections to form a plurality of indentations.

3. The tread block arrangement according to claim 1, wherein both the first sipe wall and the second sipe wall have one or more inclined sections.

4. The tread block arrangement according to claim 1, further comprising:
   a first lamella, and
   a second lamella,
   wherein a wall of the first lamella forms the first sipe wall and a wall of the second lamella opposite to the wall of the first lamella forms the second sipe wall,
   wherein a distance between the first lamella and the second lamella defines the width of the first sipe, and a height of the first lamella and the second lamella define a height of the first sipe.

5. The tread block arrangement according to claim 1, wherein the inclined section starts from a predetermined distance greater than zero from the top of the sipe.

6. The tread block arrangement according to claim 1, wherein a surface of the inclined section is flat or convex.

7. The tread block arrangement according to claim 1, wherein the first sipe wall and the second sipe wall have a plurality of indentations so that indentations of the first sipe wall and indentations of the second sipe wall are located in an alternating manner in a longitudinal direction of the sipe.

8. The tread block arrangement according to claim 1, wherein a width of the sipe at both ends in a longitudinal direction of the sipe is without the indentations, wherein a width of the sipe at both ends is constant.

9. A tire for a vehicle comprising the tread block arrangement according to claim 1.

10. The tire according to claim 9, wherein only a part of a plurality of tread blocks comprises sipes having inclined sections.

11. The tire according to claim 9, comprising shoulder tread blocks at both edges of the tread block arrangement, and middle tread blocks between the shoulder tread blocks in a transversal direction of the tread block arrangement with respect to a circumferential direction of the tire, wherein only the shoulder tread blocks comprise sipes having inclined sections.

12. The tread block arrangement according to claim 1, wherein the width of the sipe varies in a longitudinal direction of the sipe.

13. The tread block arrangement according to claim 1, wherein a depth of the second part of the sipe is from 0.1 mm to 2 mm and a depth a first part of the sipe is from 5 mm to 15 mm.

14. The tread block arrangement according to claim 1, wherein the depth the first part of the sipe is at most 90% of a depth of a groove of the tread block arrangement.

15. The tread block arrangement according to claim 1, wherein the first depth is less than a depth of a groove of the tread block arrangement.

16. The tread block arrangement of claim 1, wherein the sipe is totally within the tread block and does not continue to an edge of the tread block.

17. A tread block arrangement for a tire or for a tread band for a tire, the tread block arrangement comprising:
   a tread block comprising a sipe delimited by a first sipe wall, a second sipe wall and a bottom of the sipe, wherein the first sipe wall and the second sipe wall are arranged parallel to each other and define a width of the sipe, wherein at least the first sipe wall has at least one indentation to increase an empty volume of the sipe at a location of the indentation,
   wherein the first sipe wall has an inclined section to form said at least one indentation, wherein a distance between the first sipe wall and the second sipe wall increases towards the bottom of the sipe at a location of the inclined section, and
   wherein in a longitudinal direction of the inclined section a height of inclination differs so that the inclination starts deeper in the sipe from one end towards an other end of the inclined section;
   wherein a top of the sipe forms a zig-zag pattern and the bottom of the sipe forms a series of triangles;
   wherein the sipe comprises a first part having a first depth, and a second part having a second depth less than the first depth, wherein portions of the first part are separated by the second part so that a depth of the sipes varies in a longitudinal direction of the sipe;
   wherein the first sipe wall has a plurality of inclined sections to form a plurality of indentations; and
   wherein the sipe comprises a flat section arranged between two indentations of said plurality of indentations.

18. The tread block arrangement according to claim 17, wherein the second part of the sipe is provided in the flat section of the sipe.

* * * * *